(12) United States Patent
Kodama (10) Patent No.: US 6,425,638 B1
(45) Date of Patent: Jul. 30, 2002

(54) PAVEMENT CUTTER

(75) Inventor: Toshiharu Kodama, Fujisawa (JP)

(73) Assignee: Shiga Sangyo Kabushiki Kaisha, Kanagawa-ken (JP)

( * ) Notice: Subject to any disclaimer, the term of this patent is extended or adjusted under 35 U.S.C. 154(b) by 0 days.

(21) Appl. No.: 09/779,026

(22) Filed: Feb. 8, 2001

(30) Foreign Application Priority Data

Feb. 10, 2000 (JP) ........................................ 2000-033384
Feb. 7, 2001 (JP) ........................................ 2001-030469

(51) Int. Cl.⁷ .............................................. E01C 23/09
(52) U.S. Cl. .................... 299/39.3; 299/36.1; 299/39.9; 404/83
(58) Field of Search .............................. 30/346; 172/15, 172/603; 144/334; 404/72, 75, 83; 299/36.1, 39.1, 39.3, 39.9

(56) References Cited

U.S. PATENT DOCUMENTS

| | | | | |
|---|---|---|---|---|
| 1,825,222 A | * | 9/1931 | Curry | ........................ 404/83 |
| 3,159,952 A | * | 12/1964 | Lipkins | ...................... 451/541 |
| 3,857,425 A | * | 12/1974 | Wiklund | ..................... 144/218 |
| 4,845,896 A | * | 7/1989 | Mercaldi | .................... 451/121 |

FOREIGN PATENT DOCUMENTS

| | | | |
|---|---|---|---|
| JP | 62-15910 U | * | 10/1987 |
| JP | 62-159509 U | * | 10/1987 |
| JP | 7-279118 A | * | 10/1995 |

* cited by examiner

Primary Examiner—Heather Shackelford
Assistant Examiner—John Kreck
(74) Attorney, Agent, or Firm—Carella Byrne Bain; Elliot M. Olstein; William Squire (57) ABSTRACT

A pavement cutter that saves construction materials and prevents repaired pavements from subsiding or collapsing includes a first tilting mechanism attached to a front wheel axis as a base for a tilting mechanism where the base chassis tilts around the rear wheels without restraint; a frame where a spherical shell disk, its rotating axis and a driving unit are mounted is rotatably connected to one side of the base chassis via a hinge, a second tilting mechanism to move the spherical shell disk upward/downward and a cutting circle determining mechanism to determine a cutting radius and its center, where circular or straight cuttings are attained by exchanging the spherical shell disk to the flat disk and vice versa.

6 Claims, 6 Drawing Sheets

PAVEMENT CUTTER

BACKGROUND OF THE INVENTION

1. Field of the Invention

The present invention relates to a pavement cutter utilized in the road construction, repair and the like.

2. Brief Description of the Related Art

An asphalt cutter and a concrete cutter etc. are employed when pavement cuttings are required on road construction or repair sites. However, these cutters are only for straight and vertical cuttings. In these cutters rotating circular flat disks equipped with diamond blades etc. around their peripheries are used. Due to geometry (i.e. flat) of these cutters, naturally cut portions bear square shapes formed by straight cutting lines. In some cases, it is inevitable to cut excessively, as a result, to remove normal portions in order to remove deteriorated portions perfectly before the road repairing.

Some pavement cutters capable of circular cuttings are disclosed in the Japanese laid open patents. For example in the laid open No.7-279118 (Patent No.2528787) discloses a cutter with a trapezoidal cross section, almost spherical convex in its shape. The Japanese laid open utility model Nos. 62-159509 and 62-159510 disclose cutters having spherical convex cutting blades.

However, in the cutter disclosed in the laid open No.7-279118 where the cutting blade with trapezoidal cross section almost spherical convex is arranged, cutting friction against the pavement increases the more, the deeper the cutter penetrates into the pavement due to a geometry (trapezoidal cross section) of the cutting blade. In some cases cuttings of desired depth are impossible due to the increased friction.

Since cutters disclosed in the Japanese laid open utility models Nos. 62-159509 and 62-159510 with simple arrangements are for manual operations, they have drawbacks such as poor maneuverability and poor working efficiency from a practical point of view.

Since the above-mentioned conventional cutter are designed only for straight or circular cuttings, more tools and equipment, namely more transportation costs are required when two types of cuttings are necessary on sites.

In vertical cuttings, bonding strength between remaining portions and repaired portions tends to be weak. Sometimes repaired portions subside or collapse. (See FIG. 8B)

SUMMARY OF THE INVENTION

In view of the above-mentioned problems, the present invention is carried out to provide a pavement cutter to cut pavements into shapes for easy removing and to prevent repaired road from subsiding or collapsing. Since the road cutter according to the present invention is capable of cutting both straightly and circularly in accordance with situations, investment in the cutter is kept lower and saves transportation costs for the cutter. Further the present invention provides a cutter with good operating efficiency.

The cutter comprised as follows solve the above-mentioned problems.

(1) A pavement cutter equipped with a spherical shell disk for cutting pavement circularly by rotating a cutting blade arranged around a periphery of the spherical shell disk comprising; a base chassis equipped with front and rear wheel axes to which front and rear wheels are fixed movably and rotatably, a first tilting mechanism arranged on the front wheel axis as a base for said tilting mechanism where the base chassis is arranged so as to tilt around the rear wheels which play roles of supporting points without restraint, a frame where a rotating axis to support the spherical shell disk and a driving unit are mounted, attached to one side of said base chassis via a hinge so as to move around an axis of said hinge, a second tilting mechanism to move the spherical shell disk downward having a cutting center determining means for setting a cutting radius so as to adjust the cutting radius flexibly before cutting operations and to move the spherical shell disk upward apart from the pavement for easy movements of the pavement cutter except during cutting operations.

(2) A pavement cutter equipped with a spherical shell disk or flat disk for cutting pavement circularly or straightly by rotating by a cutting blade arranged around the periphery of the spherical shell disk comprising; a base chassis equipped with front and rear wheel axes to which front and rear wheels are fixed movably and rotatably, a first tilting mechanism arrange on the front wheel axis as a base for the tilting mechanism where the base chassis is arranged so as to tilt around the rear wheels which play roles of supporting points without restraint, a frame where a rotating axis to support the spherical shell disk and a driving unit are mounted, attached to one side of the base chassis via a hinge so as to move around an axis of said hinge, a second tilting mechanism to move the spherical shell disk downward having a cutting center determining means for setting a cutting radius so as to adjust said cutting radius flexibly before a cutting operation and to move the spherical shell disk upward apart from the pavement for easy movements of the pavement cutter except during cutting operations; wherein circular or straight cuttings are selected by exchanging from the spherical shell disk to flat disk and vice versa..

(3) The pavement cutter according to (1) or (2) wherein the arm fixed to the side face of the base chassis is arranged adjustably so as to adjust cutting radius during the circular pavement cutting.

(4) The pavement cutter according to (1) or (2) wherein an anchor is fixed to one side of the base chassis at a position where an extended axis of the hinge and an extended rotating axis of the cutting blade, an arm member to adjust a length of a sliding frame where the spherical shell disk or flat disk equipped with a rotating axis of the disk and a driving unit are mounted, is fitted to said hinge, so as to determine a cutting center of a desired cutting radius.

(5) The pavement cutter according to (1) or (2) wherein the spherical shell disk or flat disk arranged the cutting blade around the periphery of the disk has at least more than two perforations with desired sizes on desired positions except on said cutting blade for uniform cooling water supply and cooling.

(6) The pavement cutter according to (1) or (2) wherein a container for cooling water and nozzles are arranged on the base chassis so as to cool the spherical shell disk or flat disk equipped with the cutting blade by the cooling water via the nozzles.

BRIEF DESCRIPTION OF DRAWINGS

FIGS. 6A and 6B are front views of a main arrangement for adjusting a center of cutting circle where FIG. 6A shows a status without the center adjustment while FIG. 6B shows a status with the center adjustment.

FIGS. 7A to 7D are schematic views depicting wheel adjusting mechanism and wheel status where FIG. 7A depicts angle difference between inner and outer wheels during cutting operations, FIG. 7B depicts a status of the inner wheel during circular cuttings, FIG. 7C depicts a status of the inner wheel during straight cuttings and FIG. 7D is a plan view depicting an arrangement of a wheel angle adjuster.

DETAILED DESCRIPTION OF THE PREFERRED EMBODIMENT

Hereinafter embodiments according to the present invention are described by referring drawings. In FIG. 1A to FIG. 8B same characters are used when referring to the same members or portions.

Figure 1A:
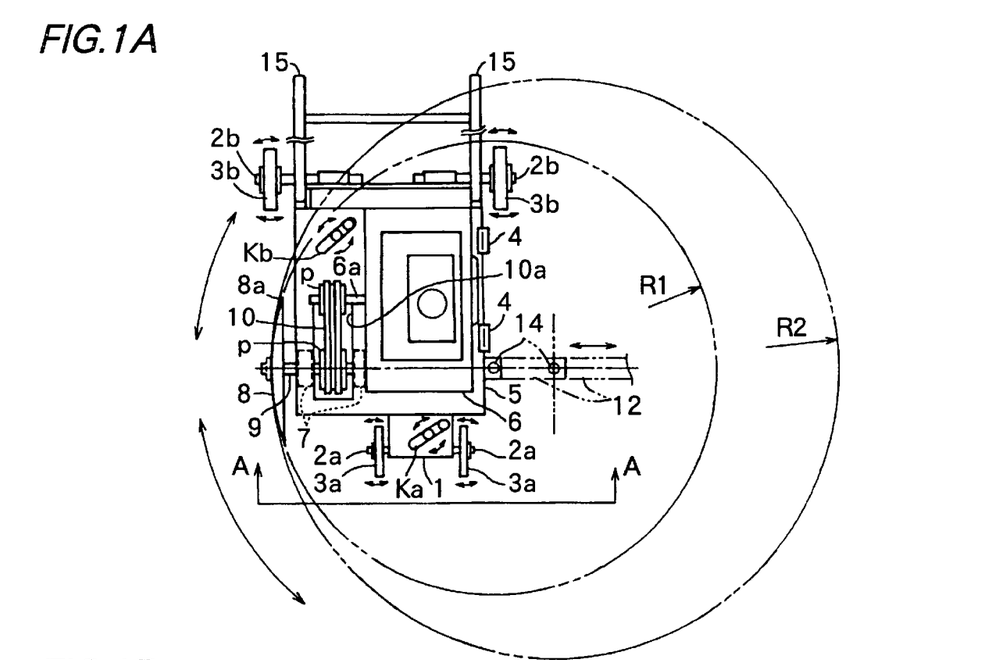
FIG. 1A is a plan view of a pavement cutter illustrating an embodiment of the present invention.
Figure 1B:
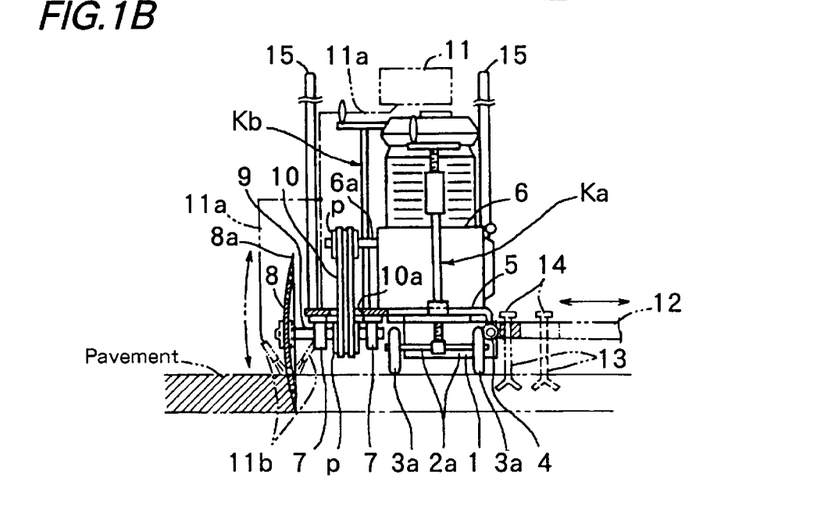
FIG. 1B is a front view of the pavement cutter viewed from the A—A side in FIG. 1A.
Figure 2:
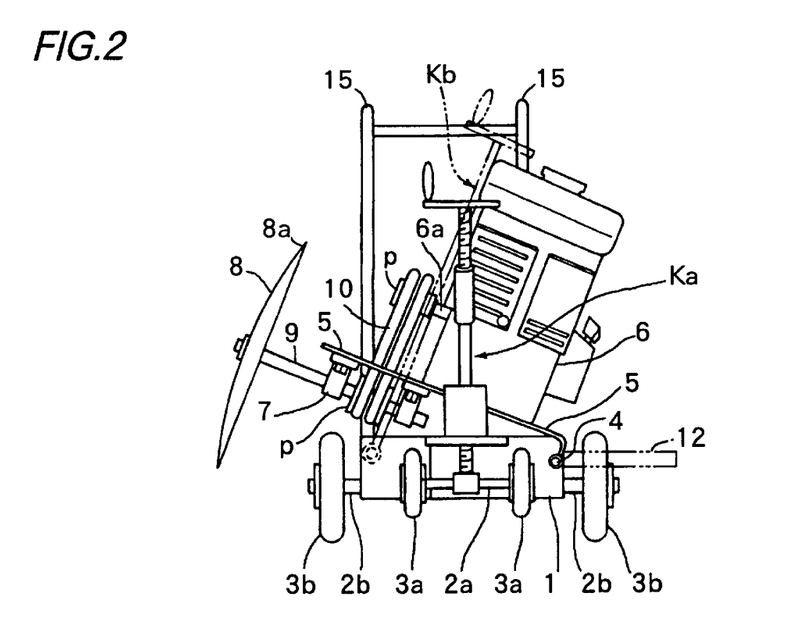
FIG. 2 is a front view of the pavement cutter in a tilted state by activating a second tilting mechanism.
Figure 3:
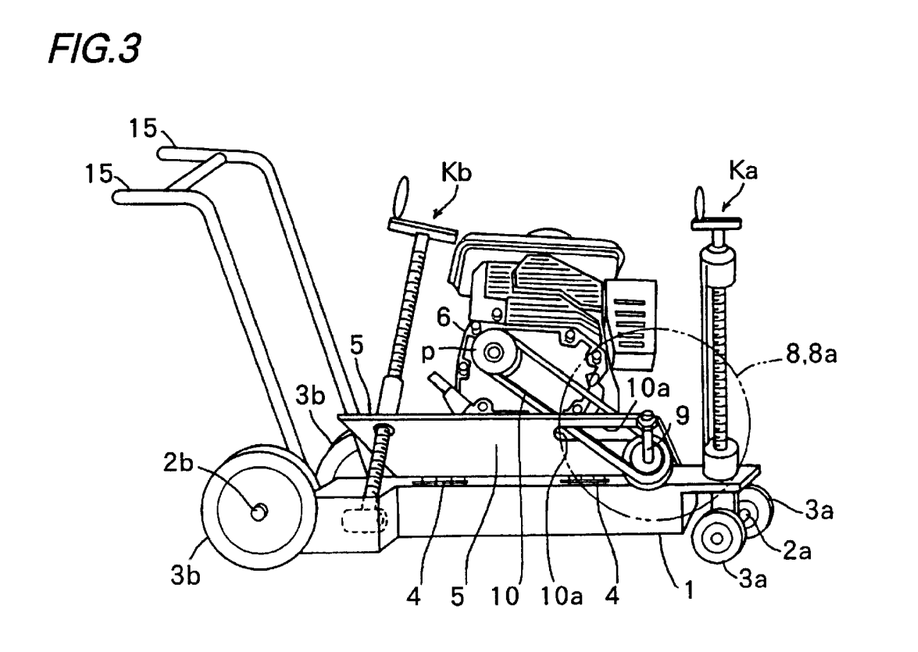
FIG. 3 is a perspective view of FIG. 2.

Axes 2a and 2b are arranged respectively at front and rear portions of a base chassis 1. Wheels 3a and 3b are fixed to the respective front/rear axes 2a and 2b movably and rotatably. A first movable tilting mechanism Ka consisting of, for example, a pair of male/female screws, is attached to the axis 2a of the front wheels 3a, which plays a role of basement for the tilting mechanism so that the above-mentioned base chassis 1 can tilt around the rear wheels 3b which play roles of supporting points of the pavement cutter without restraint. A frame 5 equipped with a second movable tilting mechanism Kb consisting of a pair of male/female screws is attached to one side face of the base chassis 1 via a hinge 4 arranged on a axis which crosses a driven axis 9, playing as a rotating axis, on a same plane. A driving unit 6 equipped with a driving axis 6a is mounted on the frame 5. A spherical shell disk 8 equipped with a cutting blade 8a around its periphery is fixed to one end of the driven axis 9, which is demountably suspended on a bottom surface of the frame 5 via bearing members 7. Pulleys p are attached to the driving axis 6a and driven axis 9 respectively so as to be connected to the counterpart pulleys via driving force transmitting belts 10, which extends through an oval opening 10a formed on the frame 5 with a stretched force applied. The belts transmit the driving force to the spherical shell disk 8 equipped with the cutting blade 8a.

Figure 4A:
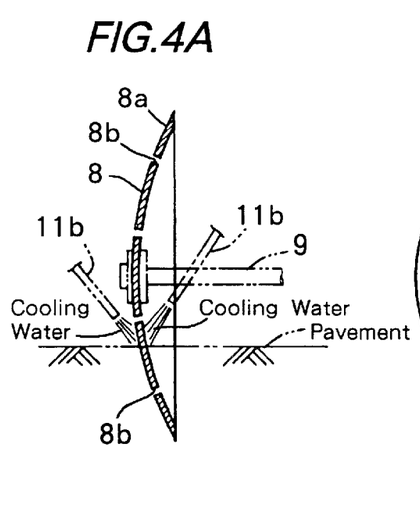
FIG. 4A is a cross sectional side view of a spherical shell disk having cutting blade around its periphery for explaining a function of cooling water.
Figure 4B:
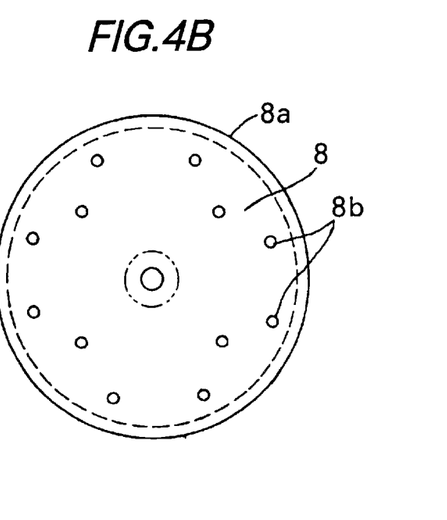
FIG. 4B is a front view of the spherical shell disk illustrating perforations for cooling water.

A cooling water container 11 is arranged above the base chassis 1 so as to supply the cooling water to any desired portions of the spherical shell disk 8 equipped with the cutting blade 8a via cooling water supply nozzles 11b from cooling water supply pipes 11a connected to the cooling water container. A plurality of perforation 8b for the cooling water are formed so as to enhance a cooling efficiency by keeping the cooling water having good contact with the spherical shell disk 8. (See FIGS. 4A and 4B.)

An arm 12 is fixed to a position on one side face of the base chassis 1 where a backward extended line of the driven axis 9 equipped with the spherical shell disk 8 meets. A supporting axis 14 formed as the circular cutting center having an anchor 13 arranged perpendicularly to the arm 12 and the arm itself comprise an adjusting mechanism Kc for adjusting circular cutting centers. The arm 12 fixed to the side face of the base chassis 1 is extendably arranged for flexible adjustments of cutting radii such as R1, R2, . . . Rn during cutting operation (See FIG. 1A) according to a selected size of the spherical shell disk 8 equipped with the cutting blade 8a. The spherical shell disk 8 is formed as a portion of a virtual sphere with the rotating radius Rn.

Figure 5:
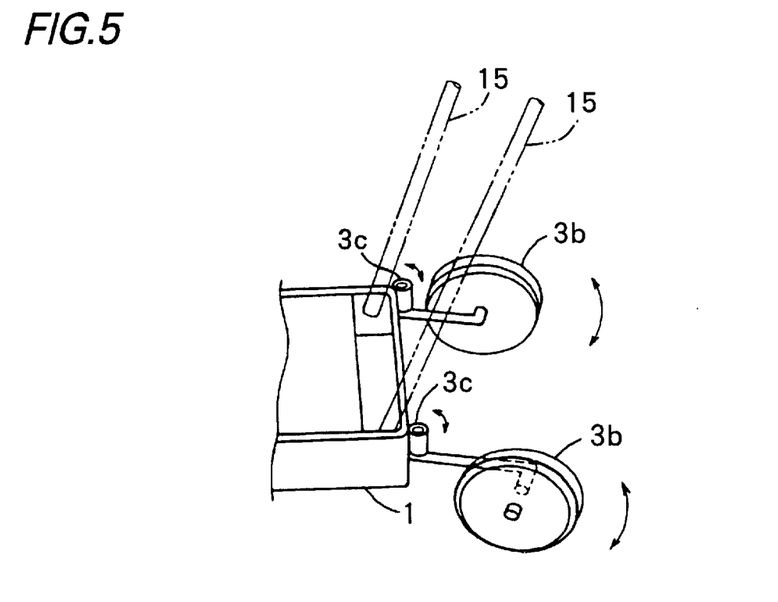
FIG. 5 is a perspective view of the wheel portion of the pavement cutter illustrating offset relations between supporting axes and rotating axes of the wheels.

During cutting operations, rotating axes of the wheels 3b and supporting axes 3c of the wheels are arranged so as to take the offset positions for smooth turns of the pavement cutter as shown in FIG. 5.

Figure 6A:
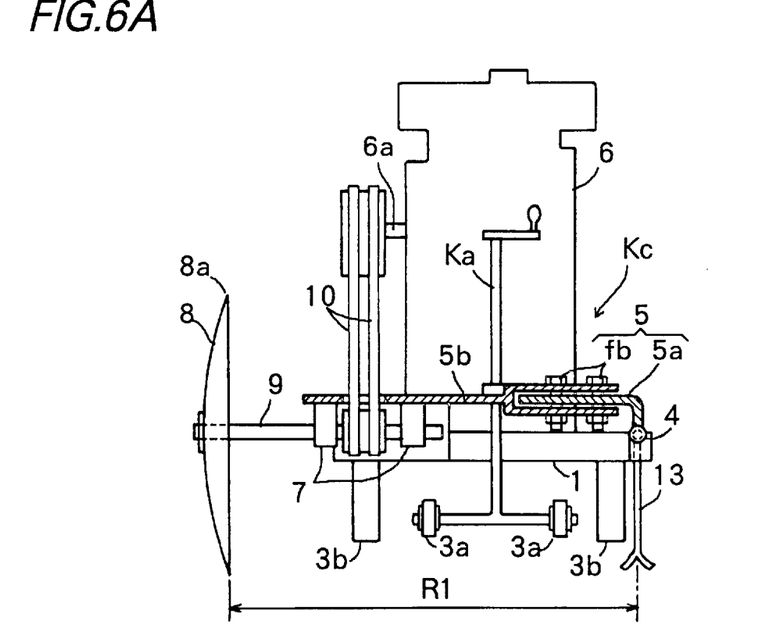
Figure 6B:
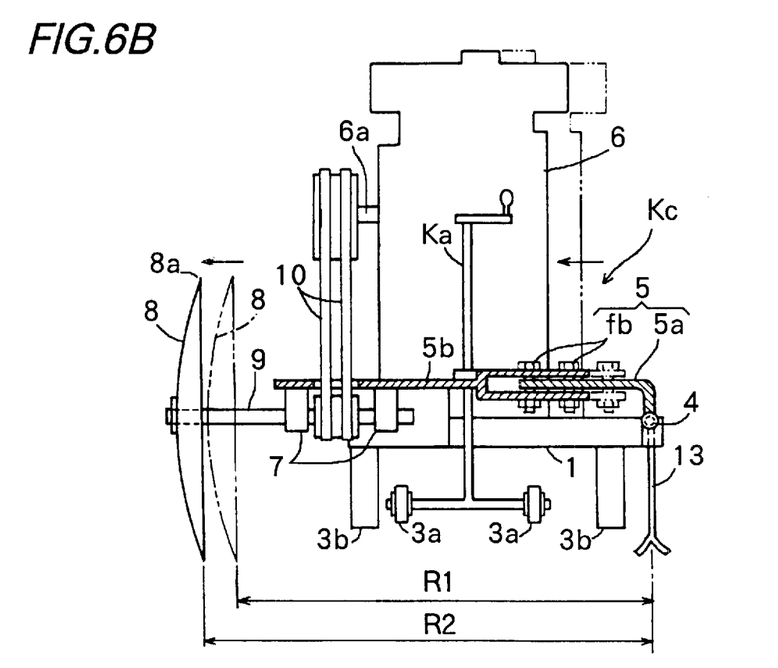

In FIGS. 6A and 6B other embodiment is depicted. In this embodiment, an anchor 13 is fixed to a position where an extended axis of the hinge 4 arranged at one side of the base chassis 1 and an extended rotating axis of the cutting blade meet. An arm member 5a is fitted to the above-mentioned hinge 4 so as to slide a frame 5b where the spherical shell disk 8 is fitted via the driven axis 9 and the driving unit 6 is mounted. A cutting center is adjustably determined according to the rotating radius R of circular cutting operation to the pavement. By arranging in this way, the cutting blade 8a, in a rotating state, is lowered to a status where the driven axis 9, as the rotating axis of the blade, is positioned parallel to the pavement corresponding to predetermined depth to be cut so that a precise cutting operation is executed without generating excessive stress on the cutting blade.

The pavement cutter according to the present invention also cut pavement straightly when the spherical shell disk is replaced by a flat disk. In the case of the straight cutting the pavement cutter is adjusted by the first tilting mechanism Ka so as to cut a desired portion where cutting is required or to be positioned above the pavement when it is not required. Thus the pavement cutter can be used in either way, circular or straight cutting.

Figure 7A:
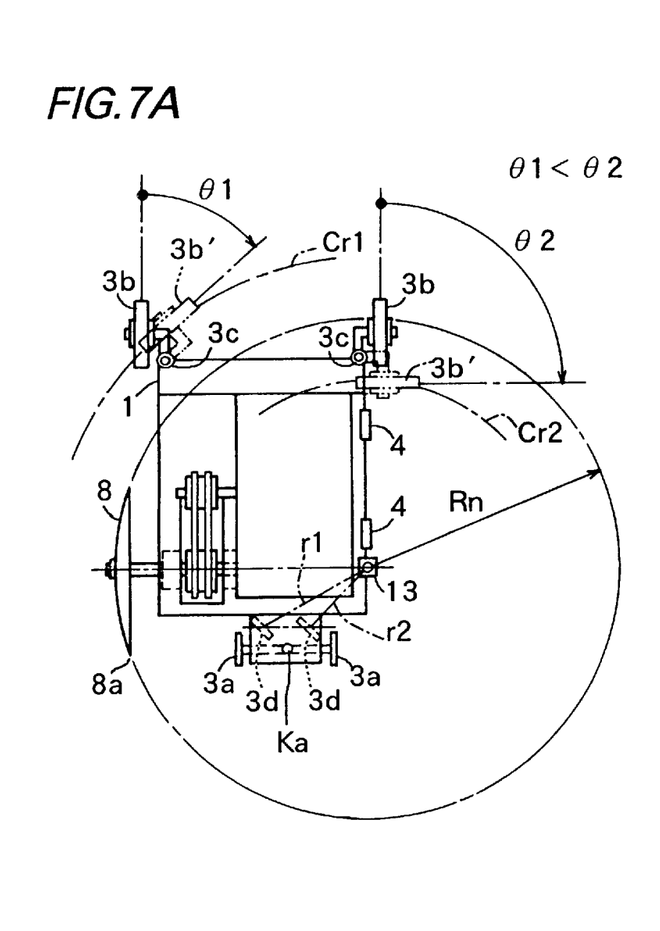
Figure 7B:
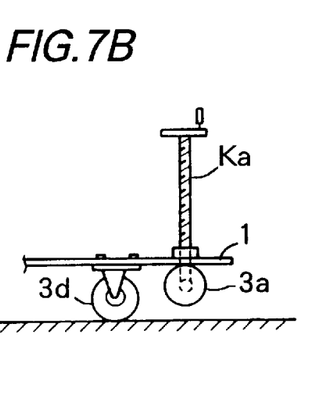
Figure 7C:
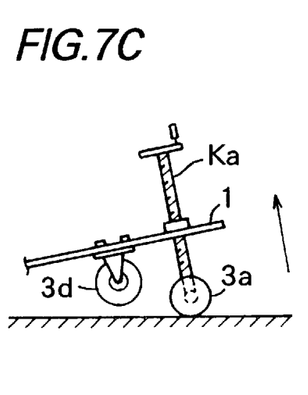

In the case of the circular cutting, inside of the wheels 3a, wheels 3d are arranged perpendicularly to radial directions of the rotating radius so as to move circularly as shown in FIGS. 7A, 7B and 7C. During the circular cuttings the wheels 3a are lifted by the first tilting mechanism Ka from the ground, while the wheels 3d touch the ground and function as described as shown in FIG. 7B. When the straight cuttings are required, the wheels 3a are lowered by the first tilting mechanism Ka, while the wheels 3d are positioned apart from the ground as shown in FIG. 7C.

The wheels 3d for the circular cuttings, positioned inside the spherical shell disk 8, may be fixed perpendicularly to the anchor 13, which is fixed to the ground so as to determine a cutting center (distances of wheels 3d from the center are fixed r1 and r2 respectively).

In the first embodiment where the cutting center is determined by the arm 12 arranged on the base chassis 1, the above-explained wheels 3d are not fixed but function as free rollers.

Hereinafter functions of the present invention are explained by referring arrangements mentioned above and drawings.

The cutting procedure according to the present invention is carried out as follows. A desired size of the spherical shell disk 8 is selected according to a required cutting blade 8a and a desired cutting radius. The spherical shell disk 8 equipped with selected cutting blade 8a is attached to a predetermined end portion of the driven axis 9 by tilting the frame 5 upward with the second tilting mechanism Kb. The arm 12 is adjusted so as to determine its effective length (radius) by the supporting axis 14, which is secured by a bolt and fixed to the pavement via the anchor 13.

An engine equipped in the driving unit 6 is started. The frame 5 is tilted around the hinge 4 as the supporting point by the tilting mechanism Kb so as to lower the spherical shell disk 8 together with the driving device 6 and the driven axis 9, until it reaches a parallel status to the pavement. Thus a desired cutting depth is determined. Then the pavement cutter is moved circularly by pushing a pushing handle 15 manually until the cutting is completed.

Figure 8A:
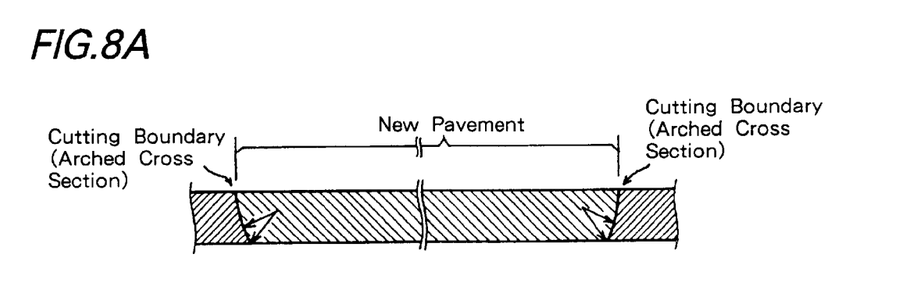
FIG. 8A is a cross sectional view of a repaired pavement showing spherically cut portions according to the present invention.
Figure 8B:
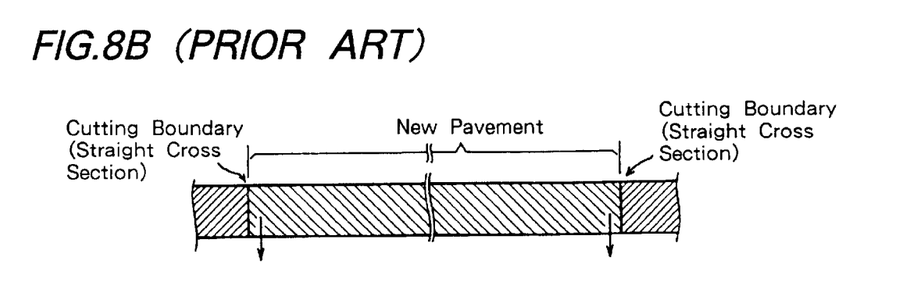
FIG. 8B is a cross sectional view of a repaired pavement showing straightly cut portions according to a conventional pavement cutter.

When the spherical shell disk according to the present invention is employed, the cut cross section shows an arched cross section i.e. a spherical surface as shown in FIG. 8A. This geometry of the cut cross section realizes more excellent adhesive property of the repaired pavement to the remaining pavement compared with the conventional cutting with the straight cross section as shown FIG. 8B, since the arched cross section prevent the repaired pavement from undesirable subsiding or collapsing and the like. Thus the repaired pavement having better appearance and more durable performance is attained. Further since cut portions have extremely flat hemi-oval cross section, another advantage of more easy removal is attained by the present invention.

Other means to determine the cutting center as shown in FIGS. 6A and 6B, may be used as an alternative. In this case, after fixing the anchor 13 to the pavement, the frame 5 with the driving unit 6 and the second tilting mechanism Kb mounted may be arranged to slide so as to determine a cutting radius by adjusting a cutting center determining means Kc. In these figures, "fb" represent fixing members such as bolts and the like of the cutting center determining means Kc for adjusting the cutting centers. In the above-mentioned way using the aid of the center determining means Kc, precise cutting operations are realized without generating excessive stress on the cutting blade, since the anchor 13 is fixed to the position where the extended axis of the hinge 4 arranged at one side of the base chassis 1 and the extended rotating axis of the cutting blade meet, and since the spherical shell disk 8 is lowered to a status where the driven axis 9, as the rotating axis of the blade, is positioned parallel to the pavement corresponding to predetermined cutting depth,.

Figure 7D:
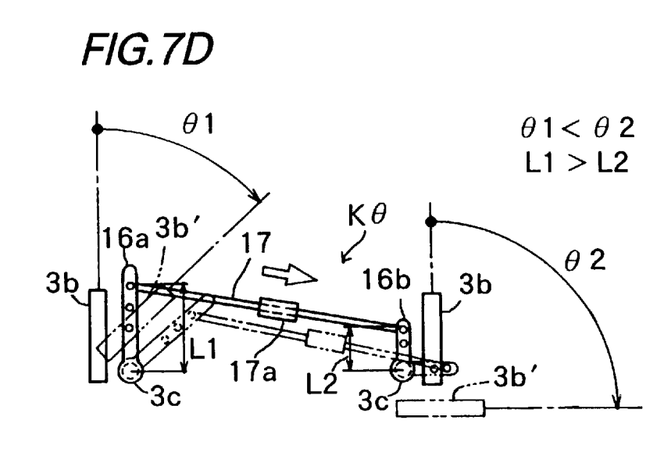

FIGS. 7A to 7D are drawings depicting wheel adjusting means and states of wheels during cutting operations. FIG. 7A depicts a difference between the outer and inner wheel 3b in respective statuses during cutting operations where wheel angles of the outer and inner wheels 3b are defined as θ1 and θ2 respectively and rolling tracks of the outer and inner wheels 3b are defined as Cr1 and Cr2 respectively. In this embodiment when θ1 is 45 degrees, θ2 amounts to almost 90 degrees (θ1<θ2). As shown in FIG. 7D, since arm members 16a and 16b respectively fitted to the supporting axes 3c to support off-set wheels 3b, are mutually linked at desired positions via a linking rod 17 so that wheels 3b move along the determined tracks, rotating disk body 8 equipped with cutting blade on its periphery can cut pavement without any difficulties.

The arm members 16a, 16b and the linking rod comprise a wheel angle adjusting means Kθ. Several openings are formed on the respective arm members so as to adjust fitting position of the linking rod 17 to the arm members 16a and 16b respectively fitted to the supporting axes 3c to support wheels 3b. Respective arm length L1 and L2 of the arm members 16a and 16b are set L1>L2. By fitting the linking rod 17 to respective desired openings of the arm members 16a and 16b via a simple procedure, the respective desired wheel angles (for example, 45 degrees for θ1 and 90 degrees for θ2) are kept so that the pavement cutter is operated with more stable rotation. The length of the linking rod 17 may be adjusted finely by revolving an adjusting member 17a.

In place of the combination of the driving belts 10 and the pulleys p, a combination of chains and sprockets may be used.

Combinations of male/female screws for the first and second tilting mechanisms Ka, Kb may be replaced by hydraulic cylinders or latch-wire mechanisms used in car side brakes.

In order protect operators and objects from rotating disk 8, covers may also be arranged.

Cutting depths are adjusted within the scope of the present invention whether the rotating axis of the cutter is position parallel to the ground or not.

According to the present invention, the pavement cutter can cut the pavement into shapes for easy removing and keep the repaired pavements etc. from subsiding or collapsing. Since the pavement cutter according to the present invention can use in both straight and circular cuttings, the present invention provides cutters having an excellent operating performance with less investment cost and less transportation costs.

What is claimed is:

1. A pavement cutter equipped with a spherical shell disk for cutting pavement circularly by rotating a cutting blade arranged around the periphery of said spherical shell disk comprising;

a base chassis equipped with front and rear wheel axes to which front and rear wheels are fixed movably and rotatably, a first tilting mechanism arranged on the front wheel axis as a base for said tilting mechanism, where said base chassis is arranged so as to tilt around the rear wheels which play roles of supporting points without restraint, a frame where a rotating axis to support said spherical shell disk and a driving unit are mounted, attached to one side of said base chassis via a hinge so as to move around an axis of said hinge, and a second tilting mechanism to move said spherical shell disk downward, wherein:

a cutting center determining means for setting a cutting radius is arranged on said base chassis so as to adjust said cutting radius flexibly before a cutting operation, said spherical shell disk is moved around said hinge upward apart from the pavement except during cutting operations, and said pavement cutter is moved and stopped at a desired position.

2. A pavement cutter equipped with a spherical shell disk or flat disk for cutting pavement circularly or straightly by rotating a cutting blade arranged around the periphery of said spherical shell disk or flat disk comprising;

a base chassis equipped with front and rear wheel axes to which front and rear wheels are fixed movably and rotatably, a first tilting mechanism arrange on the front wheel axis as the base for said tilting mechanism, where said base chassis is arranged so as to tilt around the rear wheels which play roles of supporting points without restraint, a frame where a rotating axis to support said spherical shell disk or flat disk and a driving unit are mounted, attached to one side of said base chassis via a hinge so as to move around an axis of said hinge, and a second tilting mechanism to move said spherical shell disk or flat disk downward wherein:

a cutting center determining means for setting a cutting radius is arranged on said base chassis so as to adjust said cutting radius flexibly before a cutting operation, said spherical shell disk is moved around said hinge upward apart from the pavement except cutting operations, said pavement cutter is moved and stopped at a desired position, and circular or straight cuttings are selected by exchanging from said spherical shell disk to the flat disk and vice versa.

3. The pavement cutter according to claim 1 or claim 2 wherein an arm is fixed to a side face of said base chassis and said arm equipped with an anchor arranged adjustably so as to adjust the cutting radius during the circular pavement cutting.

4. The pavement cutter according to claim 1 or claim 2 wherein an anchor is fixed to one side of said base chassis at a position where an extended axis of said hinge and an extended rotating axis of said cutting blade meet, and an arm member is fitted to said hinge to adjust a length of a sliding frame where said spherical shell disk or flat disk, a rotating axis of the disk and a driving unit are mounted so as to determine a cutting center of a desired cutting radius.

5. The pavement cutter according to claim 1 or claim 2 wherein said spherical shell disk or flat disk having the cutting blade around the periphery of said disk has at least two perforations with desired sizes on desired positions except on the cutting blade for uniform cooling water supply and cooling.

6. The pavement cutter according to claim 1 or claim 2 wherein a container for cooling water is arranged on said base chassis so as to cool said spherical shell disk or flat disk equipped with said cutting blade by the cooling water via nozzles.

* * * * *